July 6, 1948.  G. F. RACKETT  2,444,786
CINEMATOGRAPHIC OPTICAL PRINTER
HAVING A TOOTHED REGISTER BELT
Filed Nov. 2, 1945  2 Sheets-Sheet 1

Inventor
Gerald F. Rackett
by Roberts, Cushman & Grover
Att'ys.

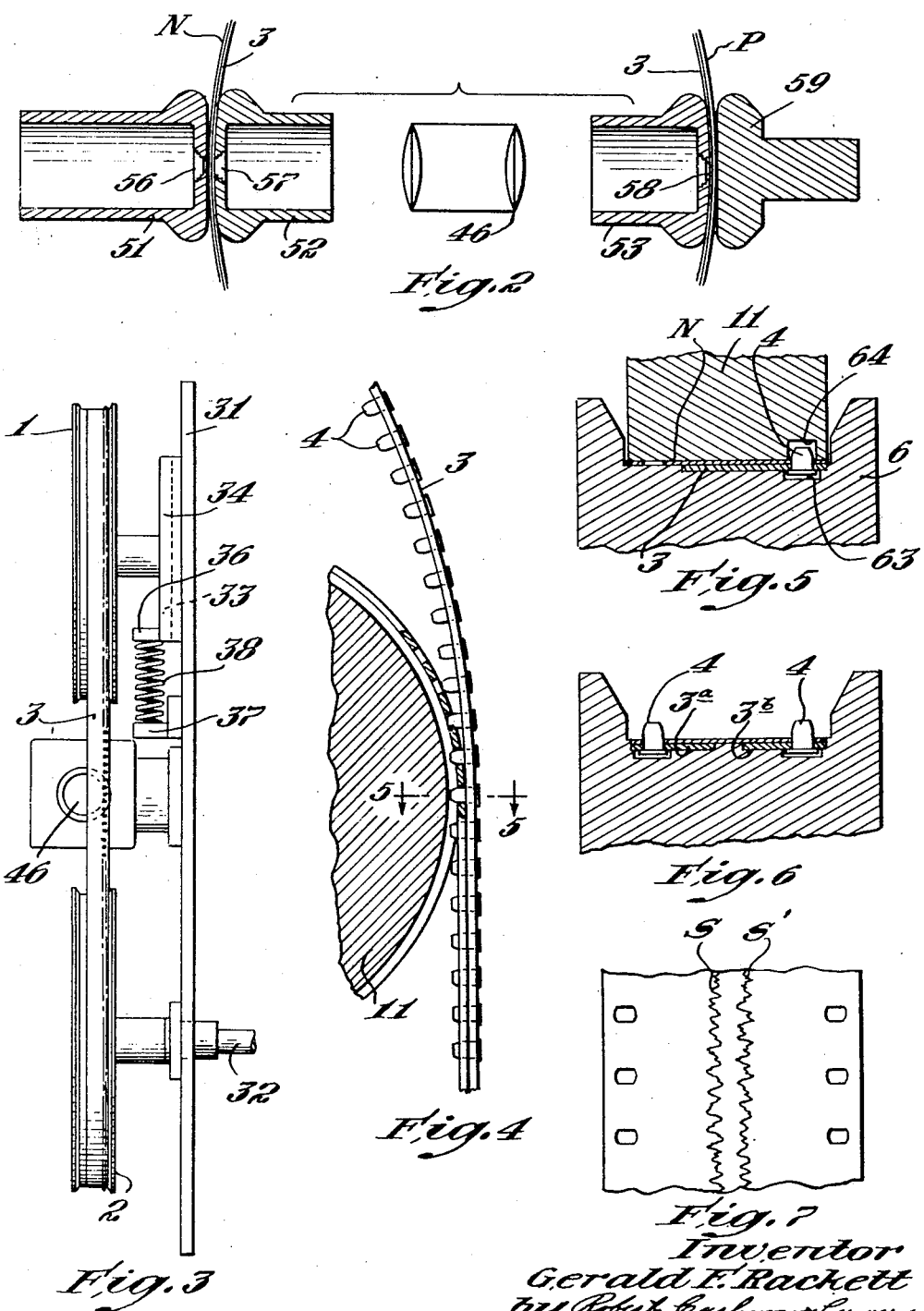

Patented July 6, 1948

2,444,786

UNITED STATES PATENT OFFICE 2,444,786

CINEMATOGRAPHIC OPTICAL PRINTER HAVING A TOOTHED REGISTER BELT

Gerald F. Rackett, Los Angeles, Calif., assignor to Technicolor Motion Picture Corporation, Hollywood, Calif., a corporation of Maine Application November 2, 1945, Serial No. 626,266

11 Claims. (Cl. 88—24)

This invention relates to projection printers and more particularly to apparatus for continuously printing a sound track from one motion picture film to another, as for example from a negative film to a positive film.

Objects of the present invention are to hold the films accurately in position in the region of the optical axis along which records are projected from one film to the other, to prevent film flutter in the region of the optical axis, to feed a shrunken film on register teeth without damage to the film, to adjust the pitch of the register teeth to the pitch of the sprocket holes of films which are shrunk to different degrees respectively, and generally to improve the art to which the present invention relates.

In one aspect the present invention involves a cinematographic printer comprising a carrier traveling in an orbital path (such as the endless belt herein disclosed or a drum as disclosed in copending application Serial No. 626,265, filed on even date herewith), the carrier having a succession of register teeth projecting outside the orbit for engagement in the sprocket holes of film, together with an optical printing system having its optical axis intersecting the orbital path at opposed points in the orbit, means for feeding films to the outer side of the carrier in advance of the aforesaid points respectively, and means for feeding the films from the carrier beyond the points respectively, whereby images may be printed on one film by projecting records across the orbit from the other film. The optical system includes a copying lens inside the orbit and longitudinal zones of the films are left uncovered by the carrier to permit the projection of images across the orbit from one film to the other as aforesaid.

In another aspect the invention involves a belt having a row of register teeth for engagement in the sprocket holes of film, together with means for feeding the belt along a predetermined path having a curved portion in which the pitch of the free ends of the register teeth differs from that of the ends which are attached to the belt, and means for varying the curvature, thereby to adjust the pitch of the free ends of the teeth to that of the sprocket holes of the film so that the film may be fed to the belt without damage to the film as the teeth enter the sprocket holes. If the film has shrunk so that the pitch of the sprocket holes is sub-standard, then the curved portion of the belt should be concave on the side of the teeth so that the pitch of the free ends of the register teeth is less than that of the ends which are attached to the belt.

In still another aspect the invention involves the method of applying film to the belt which comprises feeding the film along a curved path so that the pitch of the free ends of the register teeth differs from that of the ends which are attached to the belt, and adjusting the curvature of the path to make the pitch of the free ends of the teeth correspond with that of the sprocket holes in the film, whereby the film may be fed to the belt without damage to the film as the teeth enter the sprocket holes. In adjusting the curvature of the film to make the pitch of the free ends of the teeth correspond with the pitch of the sprocket holes of the film the pitch of the free ends of the teeth is preferably made somewhat less than that of the sprocket holes of the film to facilitate entry of the teeth into the sprocket holes.

For the purpose of illustration a typical embodiment of the invention is shown in the accompanying drawings in which Fig. 1 is a front elevation;

Fig. 2 is an enlarged vertical section taken through the optical axis, with the parts grouped closer together along the axis to conserve space;

Fig. 3 is an end elevation with parts omitted;

Fig. 4 is an edge view of the belt throughout the aforesaid curved section, one roller being shown in section;

Fig. 5 is a section on line 5—5 of Figs. 1 and 4;

Fig. 6 is a similar section showing a modification; and

Fig. 7 is an enlarged view showing film printed by the modification of Fig. 6.

Figure 1:
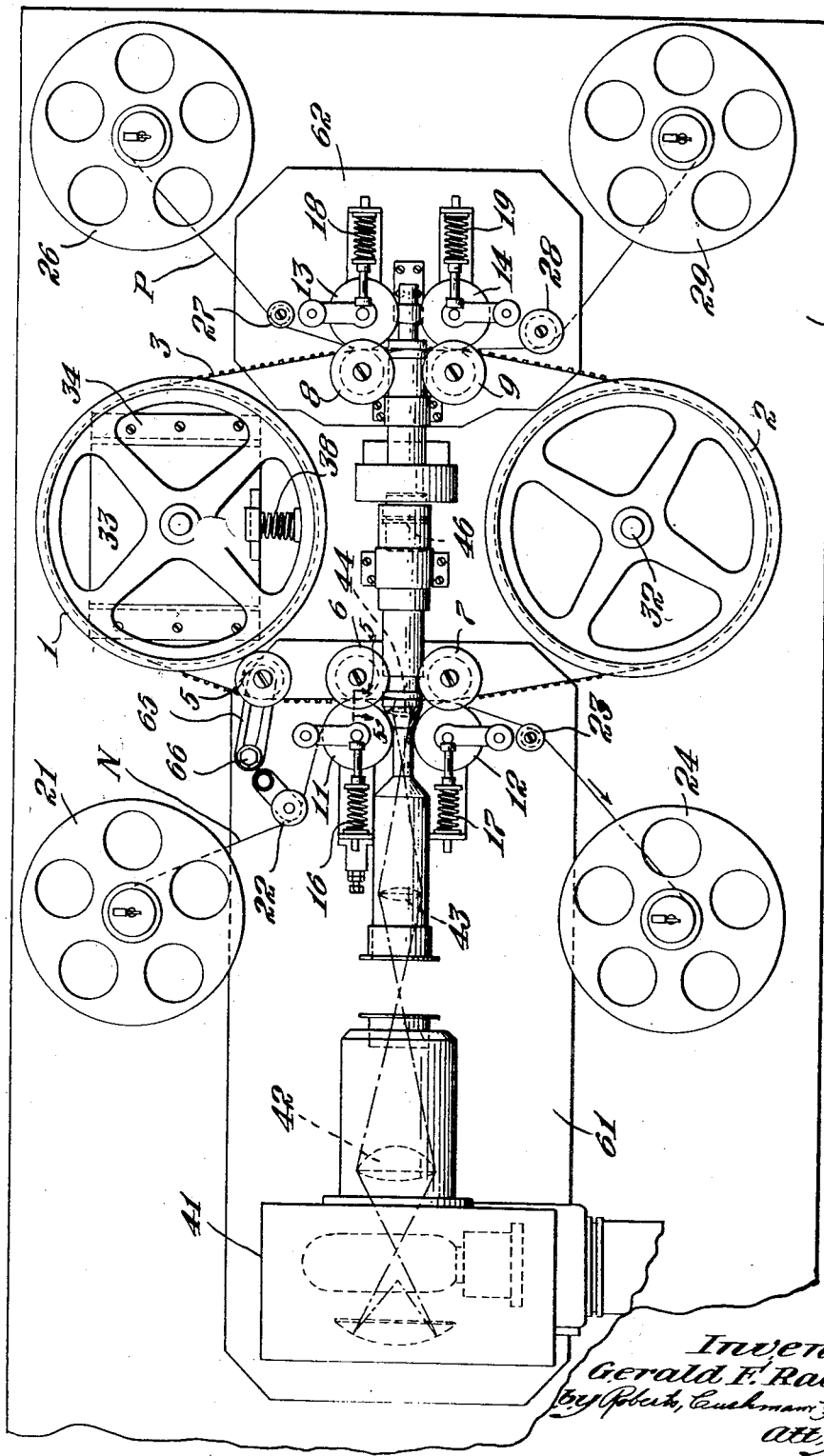

The particular embodiment of the invention chosen for the purpose of illustration comprises two sheaves 1 and 2 over which is trained a belt 3 having a marginal row of register teeth 4 adapted to fit in the sprocket holes of film. The belt preferably comprises a thin ribbon of Monel metal with the register teeth mounted in the ribbon as disclosed in Patent No. 2,356,261. Intermediate the sheaves 1 and 2 the belt travels over rollers 5, 6, 7, 8 and 9. Opposite the rollers 6, 7, 8 and 9 are rollers 11, 12, 13 and 14 which are yieldingly pressed against the rollers 6, 7, 8 and 9 by means of springs 6, 17, 18 and 19, rollers 11, 12, 13 and 14 being journaled in swinging arms which permit the rollers to move toward and from the rollers 6, 7, 8 and 9.

The printing film N is fed from supply reel 21 over roller 22, thence over roller 11 to the belt 3 where it is seated firmly over the register teeth of the belt by being compressed between the two rollers 6 and 11, thence across the optical path, thence between rollers 7 and 12, and thence over a roller 23 to a takeup reel 24. The film P to be printed is fed from a supply reel 29 over a roller 28 thence to roller 14 and the belt 3, thence across the optical axis, thence between the rollers 8 and 13 and thence over roller 27 to the takeup reel 26. As shown in Fig. 3 the parts are mounted on a back plate 31, the lower sheave 2 being driven by a shaft 32 connected to a suitable source of power and the upper sheave 1 being journaled on a support 33 which slides vertically in guide 34. Interposed between projecting lugs 36 and 37 on the sliding support 34 and the back plate 31 is a compression spring 38 which yieldingly urges the upper sheave 1 upwardly to keep the belt taut.

The optical system comprises a lamp housing 41, a condensing lens 42, a relay lens 43, an aperture lens 44 and a copying lens 46. The various parts of the optical system are mounted on the back plate 31 by means of suitable housing members and adjacent the two films the optical path is enclosed in tubular members 51, 52 and 53 having apertures 56, 57 and 58, a solid member 59 being disposed opposite 58 (Fig. 2). These members which surround the optical axis may be adjustably mounted on the back plate in any suitable manner. As shown in Fig. 1 the parts 5, 6, 7, 11, 12, 16, 17, 23, 41, 42, 43, 44, 51 and 52 may be mounted on a plate 61 which in turn may be adjustably mounted on the back plate 31 so that all of these parts may be adjusted lengthwise of the optical axis as a unit. Likewise the parts 8, 9, 13, 14, 18, 19, 27 and 28 may be mounted on another plate 62 which likewise may be adjustably mounted on the back plate 31 so that all the parts carried by the plate may be adjusted lengthwise of the optical axis as a unit.

For printing a sound track along the margin of the film the belt 1 should be somewhat more narrow than the film as indicated in Fig. 5, the belt having only one row of teeth 4 along one margin. In this case the sheaves 1 and 2 and the rollers 5, 6, 7, 8 and 9 are provided with a recess to accommodate the belt, the width of the recess being substantially equal to that of the belt. These sheaves and rollers are also provided with a somewhat deeper recess to accommodate the heads of the teeth 4 as indicated at 63 in Fig. 5. The rollers 11, 12, 13 and 14 are provided with peripheral grooves 64 to accommodate the projecting ends of the teeth 4.

In making 16 mm prints it is sometimes desirable to print on 32 mm stock and then slit the film down the middle. In such cases the soundtracks are printed along the middle of the 32 mm. stock as indicated at S and S' in Fig. 7. To make such prints the belt may be divided into two parts as indicated at 3a and 3b in Fig. 6, with a gap between the two parts through which the sound-tracks may be printed. In this case the sheaves 1 and 2 and the rollers 6, 7, 8 and 9 are provided with two grooves to receive the two parts of the belt, and the pressure rolls 11, 12, 13 and 14 are provided with two peripheral grooves to accommodate the projecting ends of the teeth 4.

The aforesaid means for varying the pitch of the projecting ends of the teeth to accommodate shrunken film is illustrated in Figs. 1 and 4. This means comprises the roller 5 and the support 65 which is adjustably mounted at 66 to vary the direction from which the belt approaches the roller 11 where it is seated against the film N. With the roller 5 in the position shown in Fig. 1 the belt approaches the roller 11 along a straight line perpendicular to the optical axis, in which case the axes of the pins 4 are parallel and the pitch of their free ends is the same as the pitch of the ends which are fastened to the belt. However by moving the roller 5 to the left the belt is caused to approach the roller 11 along a curved path which is concave on the side of the pins (Fig. 4), this being due to the inherent stiffness of the belt. When the belt is thus curved the pitch of the free ends of the pins is reduced and the pins can then enter the sprocket holes of shrunken film without damaging the film. As shown in Fig. 4 the path of the belt is straight below the plane of the axes of the rollers 6 and 11. As the belt passes this plane it gradually straightens and the teeth gradually return to parallel relationship. By this time the pins have entered the sprocket holes so that the straightening of the belt merely stretches the shrunken film without damaging the sprocket holes. By varying the degree of curvature of the film the pitch of the projecting ends of the teeth may be adjusted to whatever degree of shrinkage the film ends may possess. Similar means may be provided below the roller 9 to vary the curvature of the belt as it approaches that roller, but ordinarily this is not necessary for the reason that the positive film is printed shortly after being perforated and before it has shrunk.

As each film is fed to and from the belt there is some slippage between the belt and the film lengthwise of the film, particularly in the case of shrunken film. Inasmuch as this slippage is more or less intermittent and irregular instead of being smooth and continuous, it tends to create a lengthwise vibration of the film which is known as film flutter. However I have found that by seating each film on the belt well in advance of the optical axis and then not removing the film from the belt until well past the optical axis, this flutter is not transmitted through the film as far as the portion of the film in the optical axis. Thus the portion of the film crossing the optical axis at any moment is traveling continuously and steadily. Consequently the records may be printed without the usual distortion resulting from film flutter.

It should be understood that the present disclosure is for the purpose of illustration only and that this invention includes all modifications and equivalents which fall within the scope of the appended claims.

I claim:

1. A cinematographic printer comprising an endless belt traveling in a norbital path, the belt having a succession of register teeth projecting outside the orbit for engagement in the sprocket holes of film, spaced drums over which the belt is trained with two opposed portions intermediate the drums, guides engaging said portions to hold them in predetermined spaced relationship, an optical printing system having its optical axis intersecting said path at opposed points in said portions, means for feeding films to the outer side of the belt in advance of said points respectively, and means for feeding said films from the belt beyond said points respectively, whereby images may be printed on one film by projecting records across the orbit from the other film.

2. A cinematographic printer comprising an endless belt traveling in an orbital path, the belt having a succession of register teeth projecting outside the orbit for engagement in the sprocket holes of film, spaced drums over which the belt is trained with two opposed portions intermediate the drums, guides engaging said portions to hold them in predetermined spaced relationship, an optical printing system having its optical axis intersecting said path at opposed points in said portions, means for feeding films to the outer side of the belt at predetermined distances in advance of said points respectively, and means for feeding said films from the belt at predetermined distances beyond said points respectively, each of said distances corresponding to a plurality of picture spaces so that film flutter resulting from intermittent slippage of the films on the belt as they feed to and from the belt does not reach said points.

3. A cinematographic printer comprising an endless belt traveling in an orbital path, the belt having a succession of register teeth projecting outside the orbit for engagement in the sprocket holes of film, spaced drums over which the belt is trained with two opposed portions intermediate the drums, guides engaging said portions to hold them in predetermined spaced relationship, an optical printing system having its optical axis intersecting said path at opposed points in said portions, the optical system including a copying lens inside the orbit, means for feeding films to the outer side of the belt at predetermined distances in advance of said points respectively, and means for feeding said films from the belt at predetermined distances beyond said points respectively, longitudinal zones of the films being uncovered by the belt so that images may be printed on said zone of one film by projecting records across the orbit from said zone of the other film.

4. A cinematographic printer comprising an endless belt traveling in an orbital path, the belt having a succession of register teeth projecting outside the orbit for engagement in the sprocket holes of film, spaced drums over which the belt is trained with two opposed portions intermediate the drums, guides engaging said portions to hold them in predetermined spaced relationship, an optical printing system having its optical axis intersecting said path at opposed points in said portions, the optical system including a copying lens inside the orbit, means for feeding films to the outer side of the belt at predetermined distances in advance of said points respectively, and means for feeding said films from the belt at predetermined distances beyond said points respectively, longitudinal zones of the films being uncovered by the belt so that images may be printed on said zone of one film by projecting records across the orbit from said zone of the other film, and each of said distances corresponding to a plurality of picture spaces so that film flutter resulting from intermittent slippage of the films on the carrier as they feed to and from the carrier does not reach said points.

5. Cinematographic apparatus comprising an endless belt having a succession of register teeth for engagement in the sprocket holes of film, the width of the belt being less than that of the film so that a longitudinal zone of the film extends beyond the edge of the belt, and means for guiding the belt along an orbital path, said means comprising guides wide enough to accommodate the film with belt recesses whose dimensions approximate those of the belt and film-engaging surfaces adjacent the recesses substantially flush with the outer faces of the portion of the belt in the recesses to support said longitudinal zone of the film.

6. Cinematographic apparatus comprising an endless belt having a row of register teeth along each margin for positioning film by engagement in the marginal rows of sprocket holes respectively, the belt being divided intermediate the rows of teeth into two parts to provide space through which light may pass, means for guiding the belt along an orbital path, means at one location along said path for passing a beam of light through said space to or from the film, and means in advance of said location on said belt with the teeth of one of said parts extending into one row of sprocket holes and the teeth of the other part extending into the other row of sprocket holes.

7. Cinematographic apparatus comprising an endless belt having a row of register teeth along each margin for positioning film by engagement in the marginal rows of sprocket holes respectively, the belt being divided longitudinally throughout its entire length into two parts, the two parts being spaced apart to provide a slot through which light may pass, means for guiding the belt along an orbital path, means at one location along said path for passing a beam of light through said slot to or from the film, and means in advance of said location on said belt with the teeth of one of said parts extending into one row of sprocket holes and the teeth of the other part extending into the other row of sprocket holes.

8. Cinematographic apparatus comprising a belt having a row of register teeth for engagement with the sprocket holes of film, means for feeding the belt along a predetermined path having a curved portion in which the pitch of the free ends of the register teeth differs from that of the ends which are attached to the belt, means for feeding film to the belt in said curved portion of said path, and means for varying said curvature, thereby to adjust the pitch of the free ends of the teeth to that of the sprocket holes in the film, whereby the film may be fed to the belt without damage to the film as the teeth enter the sprocket holes.

9. Cinematographic apparatus comprising a belt having a row of register teeth for engagement with the sprocket holes of film, means for feeding the belt along a predetermined path having a portion which is concave on the side of the teeth so that the pitch of the free ends of the register teeth is less than that of the ends which are attached to the belt, means for feeding film to the belt in said concave portion of said path, and means for varying said curvature, thereby to adjust the pitch of the free ends of the teeth to that of the sprocket holes in shrunken film, whereby the film may be fed to the belt without damage to the film as the teeth enter the sprocket holes.

10. In cinematographic apparatus of the type having a belt with a row of register teeth for engagement in the sprocket holes of film, a roller having peripheral recesses to receive said teeth, means for feeding film over said roller with the film in contact with the roller throughout a predetermined arc and with the sprocket holes over said recesses, and means for feeding the belt to the roller over the film with the belt seating on the film at one location along said arc and with the teeth projecting through the sprocket holes into said recesses, whereby the teeth enter the sprocket holes along said arc as the belt gradually approaches the roller along a path which is concave on the side of the teeth so that the pitch of the free ends of the register teeth is less than that of the ends which are attached to the belt.

11. A cinematographic printer comprising an endless belt traveling in an orbital path, the belt having a succession of register teeth projecting outside the orbit for engagement in the sprocket holes of film, an optical printing system having its optical axis intersecting said path at opposed points in the orbit, the optical system including a copying lens inside the orbit, means for feeding films to the outer side of the belt at predetermined distances in advance of said points respectively, and means for feeding said films from the belt at predetermined distances beyond said points respectively, longitudinal zones of the films being uncovered by the belt so that images may be printed on said zone of one film by projecting records across the orbit from said zone of the other film, said first feeding means including a roller disposed tangentially to the orbit outside the orbit at a location where the belt is approaching said axis, the roller having peripheral recesses to receive said teeth, means for feeding film over said roller with the film in contact with the roller throughout a predetermined arc and with the sprocket holes over said recesses, the belt feeding to the roller over the film and seating on the film at one location along said arc and with the teeth projecting through the sprocket holes into said recesses, belt guiding means for making the belt concave on the side of the teeth as it approaches the roller along said arc.

GERALD F. RACKETT.

REFERENCES CITED

The following references are of record in the file of this patent:

UNITED STATES PATENTS

| Number | Name | Date |
|---|---|---|
| 1,584,185 | Mitchell | May 11, 1926 |
| 1,707,699 | Whitney | Apr. 2, 1929 |
| 1,783,045 | Kellogg | Nov. 25, 1930 |
| 2,271,572 | Rackett | Feb. 3, 1942 |